(12) United States Patent
Fichet et al.

(10) Patent No.: US 7,092,729 B1
(45) Date of Patent: Aug. 15, 2006

(54) METHOD AND APPARATUS FOR BROADCASTING AND RECEIVING ENTITLEMENT MANAGEMENT MESSAGES

(75) Inventors: Laurent Fichet, Le Mesnil Saint Denis (FR); Thierry Lepine, Paris Cedex (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 626 days.

(21) Appl. No.: 10/030,032

(22) PCT Filed: Jul. 3, 2000

(86) PCT No.: PCT/IB00/00955

§ 371 (c)(1),
(2), (4) Date: Jan. 3, 2002

(87) PCT Pub. No.: WO01/03341

PCT Pub. Date: Jan. 11, 2001

(30) Foreign Application Priority Data

Jul. 5, 1999 (EP) .................................. 99401680
Jul. 30, 1999 (EP) .................................. 99401958

(51) Int. Cl.
*H04Q 7/20* (2006.01)
(52) U.S. Cl. ................ 455/466; 455/412.2; 455/414.3; 455/419; 348/14.02; 348/465; 380/210; 380/211
(58) Field of Classification Search ................ 455/466, 455/412.1, 412.2, 414.3, 414.4, 418, 419; 348/14.02, 465, 461, 729; 380/210, 211
See application file for complete search history.

(56) References Cited

U.S. PATENT DOCUMENTS

| | | | | |
|---|---|---|---|---|
| 5,966,663 A * | 10/1999 | Gleason | ....................... | 455/466 |
| 6,005,565 A * | 12/1999 | Legall et al. | ................ | 345/721 |
| 6,057,872 A * | 5/2000 | Candelore | ..................... | 725/23 |
| 6,133,912 A * | 10/2000 | Montero | ..................... | 345/716 |
| 6,226,098 B1 * | 5/2001 | Kulakowski et al. | ...... | 358/1.14 |
| 6,229,621 B1 * | 5/2001 | Kulakowski et al. | ...... | 358/1.15 |
| 6,307,939 B1 * | 10/2001 | Vigarie | ....................... | 380/210 |
| 6,393,562 B1 * | 5/2002 | Maillard | ..................... | 713/150 |
| 6,449,494 B1 * | 9/2002 | Cashman | ................. | 455/553.1 |
| 6,466,671 B1 * | 10/2002 | Maillard et al. | ............ | 380/227 |
| 6,539,212 B1 * | 3/2003 | Kamalski | ................. | 455/186.1 |
| 6,912,519 B1 * | 6/2005 | Shouji | ........................ | 709/206 |
| 6,951,029 B1 * | 9/2005 | Kamperman et al. | ......... | 725/25 |
| 2001/0011350 A1 * | 8/2001 | Zabetian | ..................... | 713/176 |
| 2002/0080160 A1 * | 6/2002 | Devito et al. | ............... | 345/716 |
| 2003/0133418 A1 * | 7/2003 | Marshall et al. | ............ | 370/310 |

FOREIGN PATENT DOCUMENTS

| | | |
|---|---|---|
| EP | 0 461 436 | 12/1991 |
| EP | 0 817 485 | 1/1998 |
| EP | 0 866 613 | 9/1998 |
| FR | 2 672 756 | 8/1992 |
| GB | 2 311 442 | 9/1997 |
| WO | WO 98/08341 | 2/1998 |

* cited by examiner

*Primary Examiner*—Danh Cong Le
(74) *Attorney, Agent, or Firm*—Osha Liang LLP (57) ABSTRACT

The present invention provides a method of broadcasting a message having a text portion to be communicated to a user, the method including broadcasting the message in the form of an entitlement management message for reception by the user.

43 Claims, 5 Drawing Sheets

METHOD AND APPARATUS FOR BROADCASTING AND RECEIVING ENTITLEMENT MANAGEMENT MESSAGES

CROSS-REFERENCE TO RELATED APPLICATIONS

This application is a national phase application of PCT International Application Number PCT/IB00/00955, filed on Jul. 3, 2000, which claims priority of European Patent Number 99401680.6, filed Jul. 5, 1999.

FIELD OF THE INVENTION

The invention relates to methods of and apparatus for broadcasting and receiving text messages in broadcast systems such as television, radio, cellular phone or other such systems.

BACKGROUND OF THE INVENTION

Broadcast systems are used for transmitting signals, such as digital or analogue television signals, from a broadcast centre to a user, via a medium such as a satellite, cable or terrestrial broadcast link. Receiver/decoders at the user end are used for receiving and/or decoding the signals, typically for input to a television set. In the case of digital transmission, digital channels are encoded into a digital data stream at the transmitter end, and are decoded at the receiver end using a receiver/decoder, which may typically be either in a digital set-top box (DSTB) or in an integrated digital television. In the case of analogue transmission, a receiver/decoder may be provided at the user to convert the transmitted signals into a format for input to a television set.

In known broadcast systems, text messages may be sent along with a transmitted signal. A suitably equipped receiver/decoder extracts the text message from the transmitted signal for display on a television screen. Such messages are accessible by all users with suitably equipped receiver/decoders.

Known system for sending text messages tend to be inflexible.

SUMMARY OF THE INVENTION

A first aspect of the present invention provides a method of broadcasting a message having a text portion to be communicated to a user, the method comprising broadcasting the message in the form of an entitlement management message for reception by the user.

Entitlement management messages (EMMs) are normally linked to access control, and have a certain structure. The present invention enables existing apparatus, such as message generators, STM servers, ciphering units, EMM injectors and message emitters, used to generate and broadcast entitlement management messages carrying access control data to be used to generate and broadcast messages including a text portion to be communicated to a user, thus providing a convenient way in which to send the message to a user, and may also provide the advantage that the message can be encrypted using existing encryption mechanisms to ensure the confidentiality of the message. It will be appreciated that although the message takes the form of, or is based on the structure of, an entitlement management message, it may not necessarily be used for managing entitlement.

Furthermore, by broadcasting such messages in the form of an entitlement management message, the messages can be received by a receiver/decoder already configured to receive entitlement management messages carrying access control data without the need to reconfigure the receiver/decoder, for example, to receive an alternative form of message.

Preferably, the message includes at least one identifier to define a group of users for whom the message is intended. This provides the advantage that a message may be sent to a group of users without the need for the message to be sent individually to every user in that group. This may also provide the advantage that the message is communicated only to users in the group, which can prevent messages being communicated to users for whom they are not intended. This may provide a more efficient way of communicating messages to a group of users.

The text portion is preferably a section of text, for example in the form of coded or uncoded ASCII characters, which text may be for display, for example, on a user's television screen; alternatively, for example in the case of a radio system, the text could be announced to the user.

The group of users may be a selected group, selected from the totality of users, and the method may include the step of selecting the group and including in the message at least one identifier to define the selected group.

A group of users may comprise two or more users. Each identifier may be an identifier of a group having a particular characteristic. In this way, the message may be directed to those users having a certain characteristic. The characteristic may be selected from at least one of geographic area, customer category, subscription to a particular commercial offer, purchase of a particular product, and purchase of a particular session. As used herein, a commercial offer is preferably the right to view a channel or a number of channels (known as a "bouquet"); a product is preferably a programme, or a set of programmes, to which a user has subscribed; and a session is preferably a time slot on a certain channel. It will be appreciated that the audience may be split into different customer categories, such as cinema, football, rugby, age, social category etc. The invention extends to any division of users that can be identified by the operator sending the message.

It may be desired to send messages to users having a particular combination of characteristics, and thus the message may include identifiers of a plurality of characteristics. The message may further include at least one operator defining how those identifiers are to be combined. An operator may define at least one logical operator, such as AND, OR, NOT and/or XOR.

The message may include a type specifier specifying that the message is of a type which includes a text portion.

The message may include a priority specifier for specifying the priority of the message. This may for example be used to vary the way in which the message is communicated to the user.

Preferably, the message includes a signature for verifying the contents of the message. The message may be encrypted. To ensure reception by a chosen user, the message may be repetitively broadcast at a predetermined cycle rate.

In a second aspect the present invention provides a method of communicating a message having a text portion to a user, the method comprising receiving at a receiver/decoder the message in the form of an entitlement management message, and outputting from the receiver/decoder a signal representative of the text portion for communication to the user.

Preferably, the message includes at least one identifier to define a group of users for whom the message is intended. The method may further comprise determining whether the user is in said group of users. The determining step may comprise comparing the identifier to a stored identifier (preferably stored at the user's receiver/decoder). In this way a receiver/decoder may be able to determine whether or not the message is intended for the corresponding user.

The method may further comprise generating a signal for advising of receipt of the message; for example, an indication may be produced on a display of the receiver/decoder, or a message or icon may be displayed on the screen of a television connected to the receiver/decoder. In this way a user may be advised of the receipt of a message without the message itself being communicated to the user.

The signal representative of the text portion may be a display signal for enabling the text to be displayed on a user's television set.

The step of outputting a signal representative of the text may be carried out in response to a request from the user, or it may be carried out automatically without any (direct) user action.

For example, the signal may be output automatically from the receiver/decoder in dependence on the value of a priority specifier included in the message which specifies the priority of the message. Thus, for example, if an urgent message such as a hurricane warning is to be communicated to the user, this message could be assigned a high priority and could be displayed directly on a user's television set as soon as the message is received by the user's receiver/decoder, whereas other messages might be assigned a lower priority and would only be displayed on the user's television set in response to a request from the user.

The message may include an identifier of the message, and the method may further comprise comparing the identifier with an identifier of a previously received message. If the comparison reveals that the received message has the same identifier as a previously received message, then preferably the most recently received message is discarded. In this way it may be ensured that a message is not processed more than once.

In a third aspect of the invention there is provided apparatus for generating a message having a text portion to be communicated to a user, said apparatus comprising means (for example, a message generator) for generating the message in the form of an entitlement management message for reception by the user.

Preferably, means (such as a multiplexer) is provided for inserting the message into a signal for broadcast.

Preferably, the message includes at least one identifier to define a group of users for whom the message is intended. The apparatus may comprise means (for example, a system) for selecting said group from the totality of users and means (for example, a message generator) for including in said message at least one identifier to define the selected group.

Preferably, each identifier is an identifier of a group having a particular characteristic. The characteristic may be selected from at least one of geographic area, customer category, subscription to a particular commercial offer, purchase of a particular product, and purchase of a particular session.

Preferably, the apparatus comprises means (for example, a message generator) for including in said message at least one operator defining how a plurality of said identifiers are to be combined.

Preferably, the apparatus comprises means (for example, a message generator) for including in said message a type identifier identifying that the message is intended for a group of users only.

Preferably, the apparatus comprises means (for example, a message generator) for including in said message a type specifier specifying that the message is of a type which includes a text portion.

Preferably, the apparatus comprises means (for example, a message generator) for including in said message a priority specifier for specifying the priority of the message.

Preferably, the apparatus comprises means (for example, a message generator) for generating a signature for verifying the contents of the message.

Preferably, the apparatus comprises means (for example, a ciphering unit) for encrypting the message.

In a related fourth aspect, the present invention provides apparatus for broadcasting a message generated by apparatus as defined above, comprising means (such as a transmitter) for broadcasting said message in the form of an entitlement management message to a user's receiver/decoder.

The transmitter may be adapted to repetitively broadcast the message at a predetermined cycle rate.

In a fifth aspect, the present invention provides a receiver/decoder comprising means (for example, a receiver) for receiving a message in the form of an entitlement management message having a text portion, and output means (for example, an output) for outputting a signal representative of the text portion for communication to a user.

Preferably, the message includes at least one identifier to define a group of users for whom the message is intended. Preferably, the receiver/decoder comprises means (for example, a suitably programmed processor) for determining whether the user is in the group of users, said output means outputting said signal representative of the text portion if the user is in the group of users.

Preferably, the receiver/decoder comprises means (for example, a processor) for comparing said at least one identifier with at least one identifier stored at the receiver/decoder to determine whether the user is in the group of users.

Preferably, the message includes at least one operator defining how a plurality of said identifiers are to be combined, the receiver/decoder comprising means (for example, a processor) for applying said at least one operator to said plurality of identifiers to determine whether the user is in the group of users.

Preferably, the receiver/decoder comprises means (for example, a signal generator) for generating a signal for advising the user of receipt of the message by the receiver/decoder.

Preferably, the receiver/decoder comprising means (such as an input) for receiving a request from the user for output of the signal representative of the text portion.

The output means may be adapted to output automatically the signal representative of the text portion, for example, in dependence on the value of a priority specifier included in the message which specifies the priority of the message.

In a sixth aspect, the present invention provides an entitlement management message comprising a text portion for communication to a user.

In a seventh aspect, the present invention provides a signal comprising a message as aforementioned.

Features described above relating to method aspects may be applied to apparatus, receiver/decoder, message or signal aspects, and vice versa.

The invention extends to methods and/or apparatus substantially as herein described with reference to the accompanying drawings.

BRIEF DESCRIPTION OF THE DRAWINGS

Preferred features of the present invention will now be described, purely by way of example, with reference to the accompanying drawings, in which:—

DETAILED DESCRIPTION

System Overview

Figure 1:
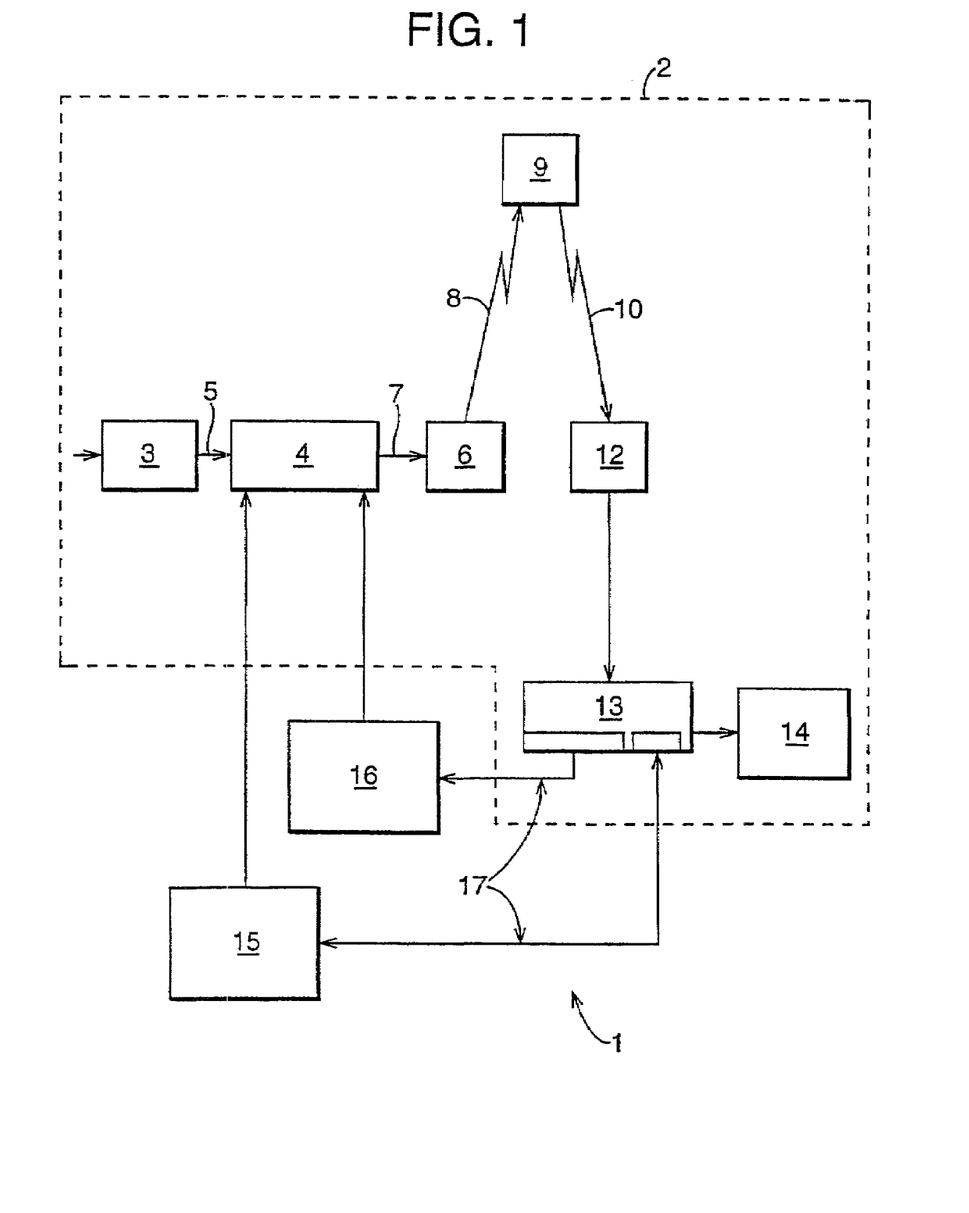
FIG. 1 shows an overview of a typical digital television system.

An overview of a digital television system 1 is shown in FIG. 1. The invention includes a mostly conventional digital television system 2 that uses the known MPEG-2 compression system to transmit compressed digital signals. In more detail, MPEG-2 compressor 3 in a broadcast centre receives a digital signal stream (typically a stream of video signals). The compressor 3 is connected to a multiplexer and scrambler 4 by linkage 5.

The multiplexer 4 receives a plurality of further input signals, assembles the transport stream and transmits compressed digital signals to a transmitter 6 of the broadcast centre via linkage 7, which can of course take a wide variety of forms including telecommunications links. The transmitter 6 transmits electromagnetic signals via uplink 8 towards a satellite transponder 9, where they are electronically processed and broadcast via notional downlink 10 to earth receiver 12, conventionally in the form of a dish owned or rented by the end user. Other transport channels for transmission of the data are of course possible, such as terrestrial broadcast, cable transmission, combined satellite/cable links, telephone networks etc.

The signals received by receiver 12 are transmitted to an integrated receiver/decoder 13 owned or rented by the end user and connected to the end user's television set 14. The receiver/decoder 13 decodes the compressed MPEG-2 signal into a television signal for the television set 14. Although a separate receiver/decoder is shown in FIG. 1, the receiver/decoder may also be part of an integrated digital television. As used herein, the term "receiver/decoder" includes a separate receiver/decoder, such as a set-top box, and a television having a receiver/decoder integrated therewith.

In a multichannel system, the multiplexer 4 handles audio and video information received from a number of parallel sources and interacts with the transmitter 6 to broadcast the information along a corresponding number of channels. In addition to audiovisual information, messages or applications or any other sort of digital data may be introduced in some or all of these channels interlaced with the transmitted digital audio and video information.

A conditional access system 15 is connected to the multiplexer 4 and the receiver/decoder 13, and is located partly in the broadcast centre and partly in the receiver/decoder. It enables the end user to access digital television broadcasts from one or more broadcast suppliers. A smartcard, capable of deciphering messages relating to commercial offers (that is, one or several television programmes sold by the broadcast supplier), can be inserted into the receiver/decoder 13. Using the receiver/decoder 13 and smartcard, the end user may purchase commercial offers in either a subscription mode or a pay-per-view mode.

As mentioned above, programmes transmitted by the system are scrambled at the multiplexer 4, the conditions and encryption keys applied to a given transmission being determined by the access control system 15. Transmission of scrambled data in this way is well known in the field of pay TV systems. Typically, scrambled data is transmitted together with a control word for descrambling of the data, the control word itself being encrypted by a so-called exploitation key and transmitted in encrypted form.

The scrambled data and encrypted control word are then received by the receiver/decoder 13 having access to an equivalent to the exploitation key stored on a smart card inserted in the receiver/decoder to decrypt the encrypted control word and thereafter descramble the transmitted data. A paid-up subscriber will receive, for example, in a broadcast monthly EMM (Entitlement Management Message) the exploitation key necessary to decrypt the encrypted control word so as to permit viewing of the transmission.

An interactive system 16, also connected to the multiplexer 4 and the receiver/decoder 13 and again located partly in the broadcast centre and partly in the receiver/decoder, enables the end user to interact with various applications via a modemmed back channel 17. The modemmed back channel may also be used for communications used in the conditional access system 15.

Conditional Access System

Figure 2:
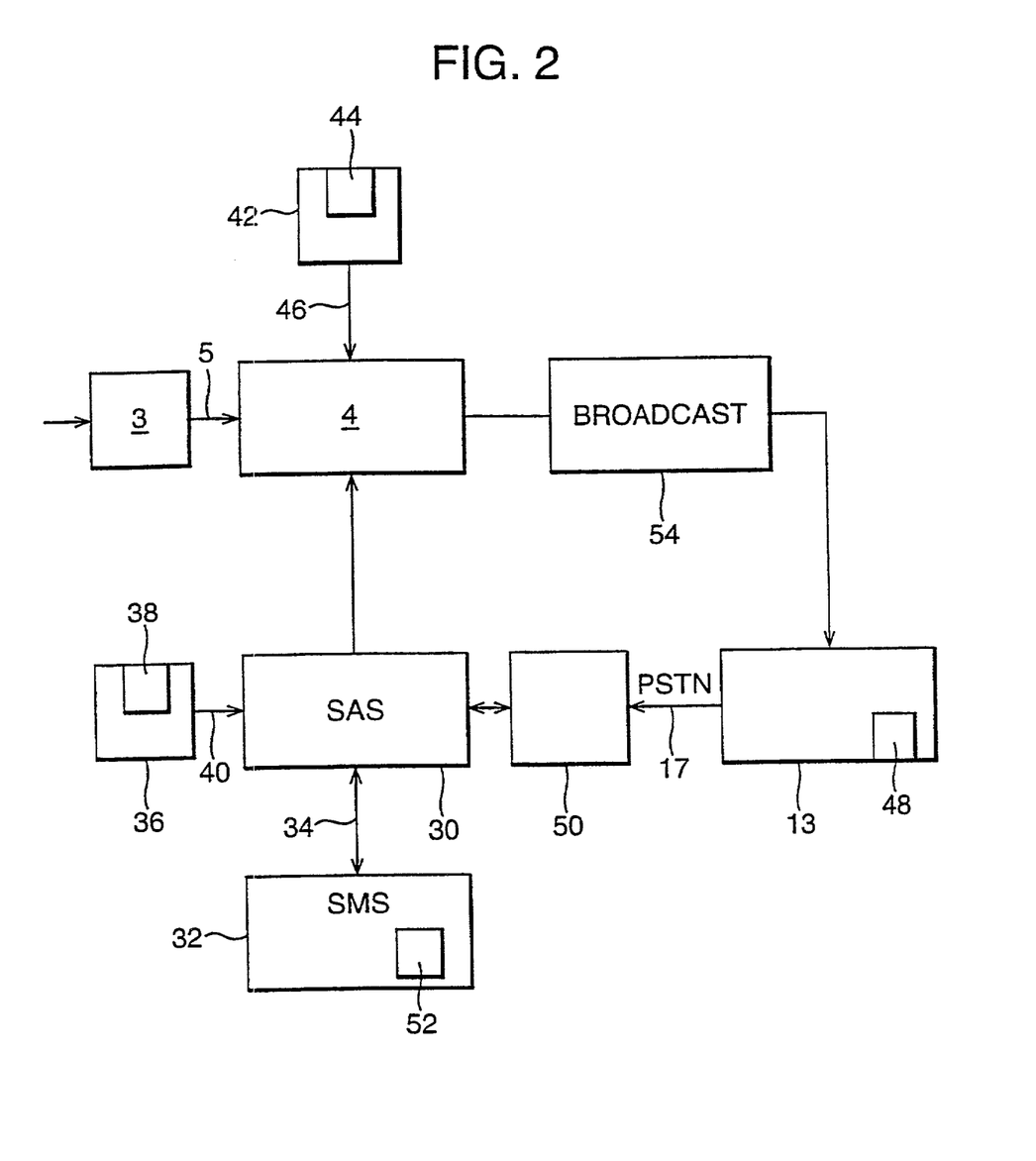
FIG. 2 shows an overview of a conditional access system.

With reference to FIG. 2, in overview the conditional access system 15 includes a Subscriber Authorization System (SAS) 30. The SAS 30 is connected to one or more Subscriber Management Systems (SMS) 32, one SMS for each broadcast supplier, by a link 34, which may be a TCP-IP link or other type of link. Alternatively, one SMS could be shared between two commercial operators, or one operator could use two SMSs, and so on.

First encrypting units in the form of ciphering units 36 utilising "mother" smartcards 38 are connected to the SAS by linkage 40. Second encrypting units again in the form of ciphering units 42 utilising mother smartcards 44 are connected to the multiplexer 4 by linkage 46. The receiver/decoder 13 receives a "daughter" smartcard 48. The receiver/decoder is connected directly to the SAS 30 via Communications Servers 50 and the modemmed back channel 17. The SAS sends amongst other things subscription rights to the daughter smartcard on request.

The smartcards contain confidential information from one or more commercial operators. The "mother" smartcard encrypts different kinds of messages and the "daughter" smartcards decrypt the messages, if they have the rights to do so.

With reference to FIG. 2, in the broadcast centre, the digital video signal is first compressed (or bit rate reduced), using the MPEG-2 compressor 3. This compressed signal is then transmitted to the multiplexer and scrambler 4 in order to be multiplexed with other data, such as other compressed data.

The scrambler generates a control word used in the scrambling process and included in the MPEG-2 stream in the multiplexer 4. The control word is generated internally and enables the end user's integrated receiver/decoder 13 to descramble the programme.

Access criteria, indicating how the programme is commercialised, are also added to the MPEG-2 stream. The programme may be commercialised in either one of a number of "subscription" modes and/or one of a number of "Pay Per View" (PPV) modes or events. In the subscription mode, the end user subscribes to one or more commercial offers, or "bouquets", thus getting the rights to watch every channel inside those bouquets. In the Pay Per View mode, the end user is provided with the capability to purchase events as he wishes.

Both the control word and the access criteria are used to build an Entitlement Control Message (ECM), this is a message sent in relation with one scrambled program; the message contains a control word (which allows for the descrambling of the program) and the access criteria of the broadcast program. The access criteria and control word are transmitted to the second encrypting unit 42 via the linkage 46. In this unit, an ECM is generated, encrypted and transmitted on to the multiplexer and scrambler 4.

Each service broadcast by a broadcast supplier in a data stream comprises a number of distinct components; for example a television programme includes a video component, an audio component, a sub-title component and so on. Each of these components of a service is individually scrambled and encrypted for subsequent broadcast. In respect of each scrambled component of the service, a separate ECM is required.

The multiplexer 4 receives electrical signals comprising encrypted EMMs from the SAS 30, encrypted ECMs from the second encrypting unit 42 and compressed programmes from the compressor 3. The multiplexer 4 scrambles the programmes and transmits the scrambled programmes, the encrypted EMMs and the encrypted ECMs as electric signals to broadcast system 54, which may be for example a satellite system as shown in FIG. 1, or other broadcast system. The receiver/decoder 13 demultiplexes the signals to obtain scrambled programmes with encrypted EMMs and encrypted ECMs.

The receiver/decoder receives the broadcast signal and extracts the MPEG-2 data stream. If a programme is scrambled, the receiver/decoder 13 extracts the corresponding ECM from the MPEG-2 stream and passes the ECM to the "daughter" smartcard 48 of the end user. This slots into a housing in the receiver/decoder 13. The daughter smartcard 48 controls whether the end user has the right to decrypt the ECM and to access the programme. If not, a negative status is passed to the receiver/decoder 13 to indicate that the programme cannot be descrambled. If the end user does have the rights, the ECM is decrypted and the control word extracted. The decoder 13 can then descramble the programme using this control word. The MPEG-2 stream is decompressed and translated into a video signal for onward transmission to television set 14.

If the programme is not scrambled, no ECM will have been transmitted with the MPEG-2 stream and the receiver/decoder 13 decompresses the data and transforms the signal into a video signal for transmission to television set 14.

The Subscriber Management System (SMS) 30 includes a database 52 which manages, amongst others, all of the end user files, commercial offers (such as tariffs and promotions), subscriptions, PPV details, and data regarding end user consumption and authorization. The SMS may be physically remote from the SAS.

The SMS 32 transmits messages to the SAS 30 which imply modifications to or creations of Entitlement Management Messages (EMMs) to be transmitted to end users. The SMS 32 also transmits messages to the SAS 30 which imply no modifications or creations of EMMs but imply only a change in an end user's state (relating to the authorization granted to the end user when ordering products or to the amount that the end user will be charged). The SAS 30 also sends messages (typically requesting information such as call-back information or billing information) to the SMS 32, so that it will be apparent that communication between the two is two-way.

Entitlement Management Messages (EMMs)

The EMM is a message dedicated to an individual end user (subscriber), or a group of end users, only, in contrast with an ECM, which is dedicated to one scrambled programme only or a set of scrambled programmes if part of the same commercial offer.

Various specific types of EMM are possible. Individual EMMs are dedicated to individual subscribers, and are typically used in the provision of Pay Per View services; these contain the group identifier and the position of the subscriber in that group. So-called "Group" subscription EMMs are dedicated to groups of, say, 256 individual users, and are typically used in the administration of some subscription services. Audience EMMs are dedicated to entire audiences. An "audience" is the totality of subscribers having smartcards which bear the same Operator Identifier (OPI). Finally, a "unique" EMM is addressed to the unique identifier of the smartcard.

In preferred embodiments, audience EMMs are used to convey messages to specific groups of users.

Figure 3:
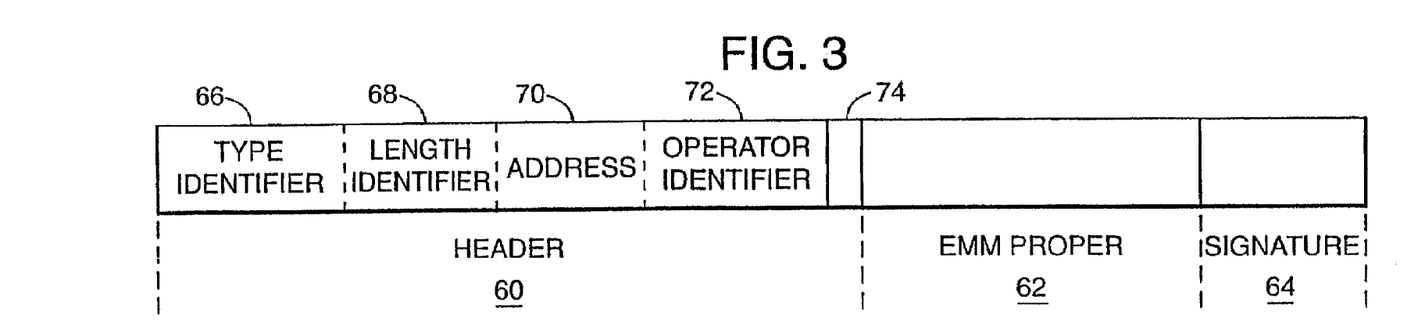
FIG. 3 shows the structure of an Entitlement Management Message (EMM)

The general form of an EMM which is used in the preferred embodiments is now described with reference to FIG. 3. Basically, the EMM, which is implemented as a series of digital data bits, comprises a header 60, the EMM proper 62, and a signature 64. The header 60 in turn comprises a type identifier 66 to identify the type of EMM, a length identifier 68 which gives the length of the EMM, an optional address 70 for the EMM, an operator identifier 72 and a key identifier 74. Finally, the signature 64, which is also optional, provides a number of checks against corruption of the remaining data in the EMM. The type identifer in the header identifies the message as an EMM.

Subscriber Authorization System (SAS)

Messages generated by the SMS 32 are passed via linkage 34 to the Subscriber Authorization System (SAS) 30, which in turn generates messages acknowledging receipt of the messages generated by the SMS 32 and passes these acknowledgements to the SMS 32. Messages which may be passed to the SAS include subscriber suspension, for example, due to non-payment, subscriber modification, for example to add or remove certain commercial offers, and provide rights, for example for a specific event in PPV mode.

The SAS 30 manages databases that store the status of all subscribers declared by the SMS 32. According to the status and the various messages sent by the SMS, the SAS generates EMMs for the subscribers' smartcards. The EMMs are ciphered by the SAS ciphering units 36 and sent to the multiplexer 4. To ensure that the EMMs are received by the subscriber, the SAS sends these messages cyclically. The cycle depends on the type of EMM, but is typically between 30 seconds and 30 minutes.

Figure 4:
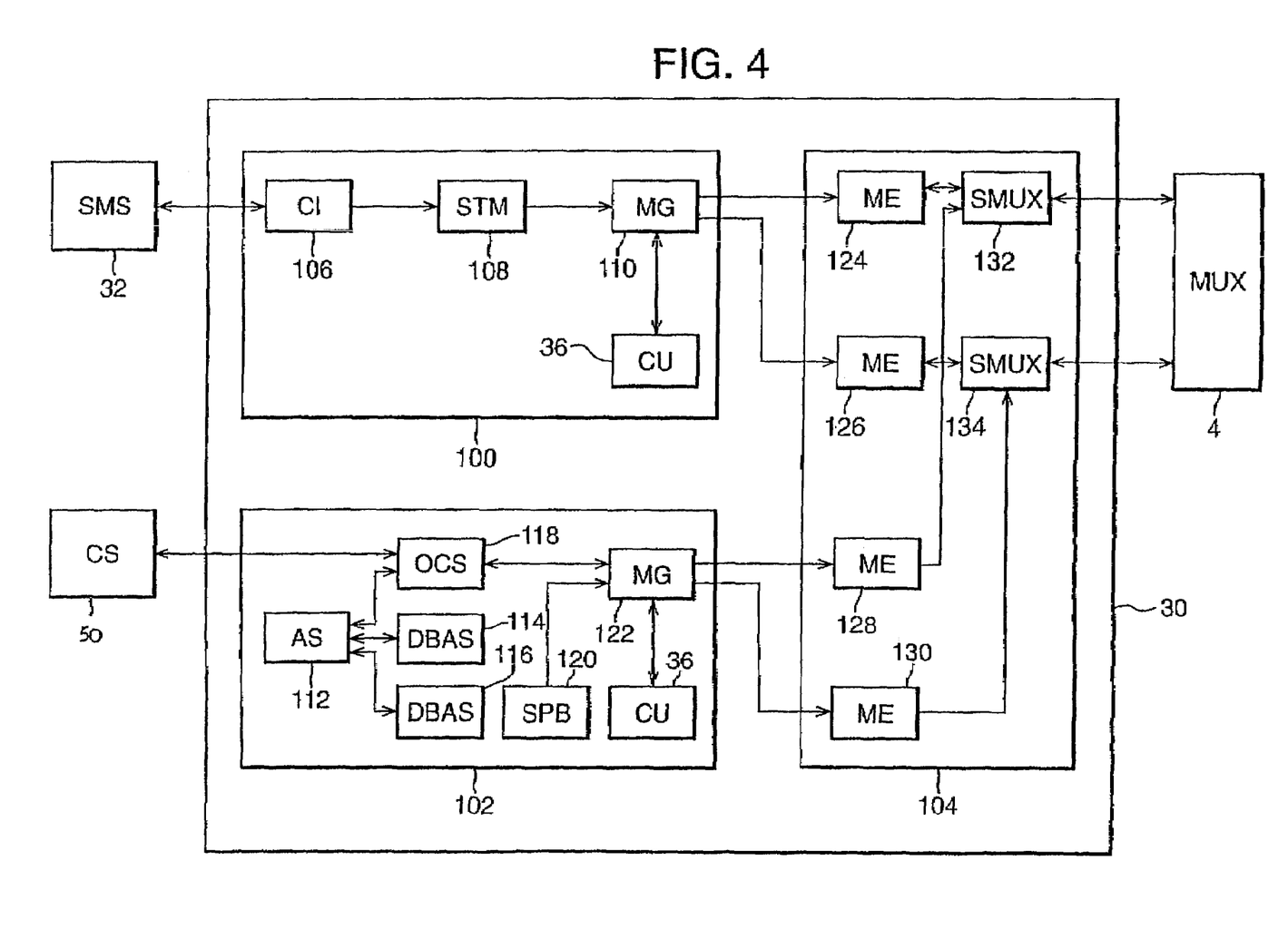
FIG. 4 shows the structure of a Subscriber Authorization System.

A typical configuration of the SAS 30 is shown in FIG. 4. In overview the SAS 30 comprises a Subscription Chain area 100 to give rights for subscription mode and to renew the rights automatically each month, a Pay Per View (PPV) Chain area 102 to give rights for PPV events, and an EMM Injector 104 for passing EMMs created by the Subscription and PPV chain areas to the multiplexer and scrambler 4, and hence to feed the MPEG stream with EMMs. If other rights are to be granted, such as Pay Per File (PPF) rights in the case of downloading computer software to a user's Personal Computer, other similar areas are also provided.

One function of the SAS 30 is to manage the access rights to television programmes, available as commercial offers in subscription mode or sold as PPV events according to different modes of commercialisation (pre-book mode, impulse mode). The SAS 30, according to those rights and to information received from the SMS 32, generates EMMs for the subscriber.

The Subscription Chain area 100 comprises a Command Interface (CI) 106, a Subscriber Technical Management (STM) server 108, a Message Generator (MG) 110, and the Ciphering Unit 36. The PPV Chain area 102 comprises an Authorisation Server (AS) 112, Database Servers 114, 116 which contain relational databases for storing relevant details of the end users, Order Centralized Server (OCS) 118, a Server for Programme Broadcaster (SPB) 120, a Message Generator (MG) 122 whose function is basically the same as that for the Subscription Chain area, and Ciphering Unit 36.

The EMM Injector 104 comprises a plurality of Message Emitters (MEs) 124, 126, 128 and 130 and Software Multiplexers (SMUXs) 132 and 134. In the preferred embodiment, there are two MEs, 124 and 126 for the Message Generator 132, with the other two MEs 128 and 130 for the Message Generator 134. MEs 124 and 126 are connected to the SMUX 132 whilst MEs 128 and 130 are connected to the SMUX 134.

The Message Generators 110 and 122 transform commands issued by the STM 108 and the OCS 118, respectively, into EMMs. The MGs determine the duration and the rate of emission of the EMMs. The MGs also cipher the EMMs using a dedicated ciphering unit. They then pass the ciphered EMM to the respective MEs, which transmit the EMMs cyclically. As shown in FIG. 4, more than one ME can be connected to a single MG, the appropriate ME being determined by the MG according to the operator referred to in the EMM. During the lifetime of a given EMM, the MG stores it inside its own database. The EMM is erased from the database as soon as its emission duration has expired. This database ensures consistency between the MG and ME.

The Message Emitters 124, 126, 128, 130 receive EMMs from the respective MGs along with several parameters, such as broadcast start date, broadcast stop date, and broadcast cycle. The MGs then manage the broadcast of the EMMs according to the specified parameters.

Mail Messages

The present broadcasting system 1 is adapted to send mail messages, typically in the form of an ASCII string, from the commercial operator (broadcast supplier) at the SMS to a user's receiver/decoder. Mail messages generally consist of text messages which are intended for display on a users television set. Mail messages may be sent in the form of a particular type of EMM, or by other means. In the present embodiment so-called Audience Mail Messages are used to convey mail messages to particular groups of subscribers.

Audience Mail Messages allow a commercial operator to send a message to all users in a particular group, without the need to address each user in the group individually. This can optimist the bandwidth used for transmitting messages, since few messages need be transmitted.

The users to whom an Audience Mail Message is addressed may be selected depending on one or more parameters. Examples of such parameters are as follows:

Geographic zone. The message is only available to users within the specified geographic zone.

Customer category. The message is only available to users having a specified customer category such as cinema, football, rugby, age, etc.

Commercial offer. The message is only available to subscribers to the specified commercial offer.

Session number. The message is only available to users who have access to the specified session.

Product number. The message is only available to users to a particular product.

In this way, messages intended for certain groups of users may be directed to users within that group but not to other users. For example, a bad weather warning may be directed to users within a specific geographic zone, or people who subscribed to a particular film (with an associated product number) could be informed that the sequel to that film will be broadcast, or people who subscribe to a particular channel (as part of a commercial offer), such as a wildlife channel could be informed that a particular wildlife programme is about to begin.

Figure 5:
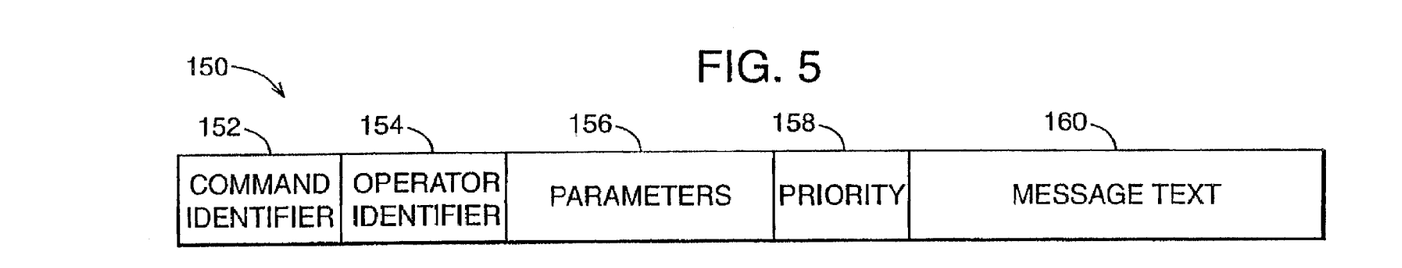
FIG. 5 shows the structure of an Audience Mail Message command.

In order to send an Audience Mail Message, the operator sends an Audience Mail Message command from the SMS 32 to the SAS 30. Referring to FIG. 5, Audience Mail Message command 150 comprises a command identifier 152, which identifies the command as an Audience Mail Message command, operator identifier 154, which identifies the operator, one or more identifiers 156 which specify the group of users for whom the mail message is intended, a priority field 158, and the text message 160 in the form of an ASCII string.

In a preferred embodiment the group addressed depends on one of more of at least geographic area, customer category, commercial offer, session number and product number. Depending on the implementation, only one identifiers may be used with any one mail message, or a plurality of identifiers may be used. In the latter case, the plurality of identifiers may be combined using logical operators such as AND, OR, XOR and/or NOT, as specified in the command.

Use of logical operators enables several criteria to be used to target specific groups of users. As an example, several geographic zones may exist, Marseille being one of them, and Paris another, and the audience may have been split into different customer categories, such as cinema, football, rugby etc. If the product reference for a specific football match between Marseille and Paris is 1234, then a message could be sent to fans of the two clubs who have not yet purchased the match, advising them of the match, by using the following combination:

(Geographical_Zone=Marseille OR Geographical_Zone=Paris) AND Customer_Category=Football AND NOT Product=1234

In certain implementations parentheses may not be available, in which case two messages could be sent to groups of users using the following combinations:

Geographical_Zone=Marseille AND Customer_Category=Football AND NOT Product=1234

Geographical_Zone=Paris AND Customer_Category=Football AND NOT Product=1234

In either case, the logical operators which are to be used are defined by the operator and included in parameters 156 in command 150 from the SMS 32 to the SAS 30.

The priority field 158 specifies the priority of the message. If the priority field is left blank, the message is assigned a normal priority.

When the SAS receives an Audience Mail Message command it constructs a special EMM in order to transmit the message to the user. Referring again to FIG. 4, the command sent from the SMS is received by the Command Interface (CI) 106 and passed to the Subscriber Technical Management (STM) server 108. The STM server 108 identifies the command as an Audience Mail Message command. It then sends a command to the Message Generator (MG) to generate an Audience Mail Message EMM.

Figure 6:
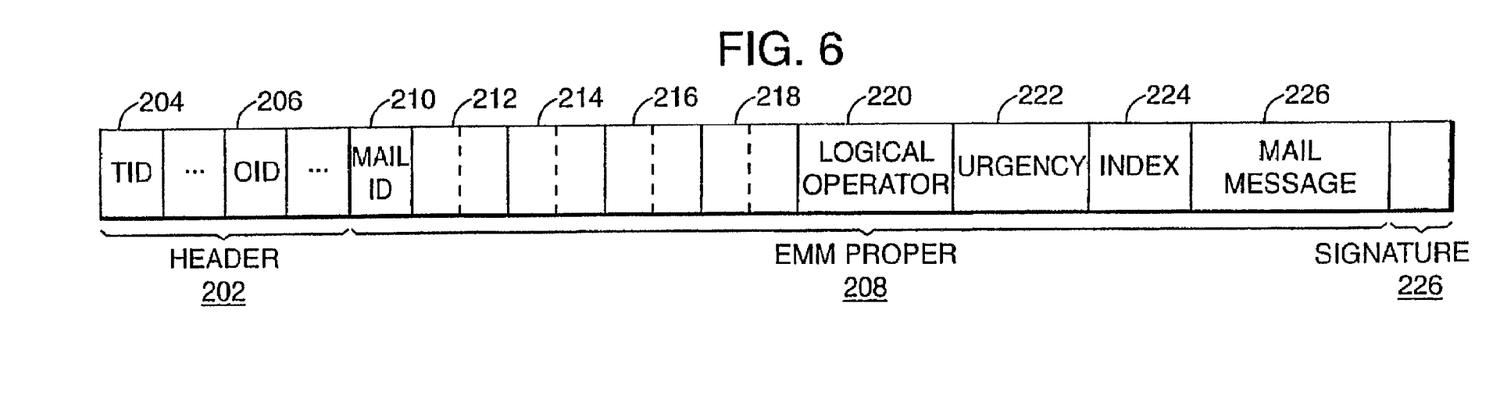
FIG. 6 shows the structure of an Audience Mail Message EMM.

The Message Generator (MG) 110 generates an Audience Mail Message in the form of an EMM on receiving the command from the STM server 108. The structure of the Audience Mail Message EMM is shown in FIG. 6. Referring to FIG. 6, the EMM 200 comprises a header 202, EMM proper 208, and, optionally, signature 226. Header 202 contains a type identifier 204 and an operator identifier 206 as well as other information as described above with reference to FIG. 3. The type identifier identifies the EMM as a group EMM, that is, as specific to a group of users.

The EMM proper 208 comprises an identifier 210 which identifies the EMM as an Audience Mail Message EMM, a number of identifiers 212, 214, 216, 218 which specify the group to which the EMM is addressed, a logical operator field 220 which specifies one or more logical operator, a priority specifier 222, index 224, and the text message 226.

In a preferred embodiment, each identifier 212, 214, 216, 218 comprises two parts, the first part specifying which characteristic that identifier relates to, and the second specifying the value. In an alternative embodiment, each characteristic is allocated a particular part of the EMM, in which case each identifier merely comprises a value.

Referring to FIG. 6, in a particular example, identifier 212, which is two bytes long, specifies a commercial offer; identifier 214, which is also two bytes long, specifies a geographic zone; identifier 216, which is three bytes long, specifies a session number; and identifier 218, which is three bytes long, specifies a product number. In any particular EMM, one or more of the above identifiers may be missing; for example, a simple implementation may include a single identifier having a first part specifying which characteristic that identifier relates to, and a second part specifying the value.

Logical operator field 220 specifies one or more logical operator, such as AND, OR, XOR and/or NOT that is to be applied to the identifiers 212, 214, 216 and 218, as specified in the command 150 from the SMS 32 to the SAS 30. The priority specifier 222 takes a value depending on the priority of the message, as specified by the operator in the command from the SMS to the SAS. Index 224 takes a value which is specific to that particular EMM, so that that EMM can be identified. Mail message 226, which is typically 89 bytes long, contains the actual text message, in the form of an ASCII string, which is to be conveyed to the user.

The MG 110 also determines the broadcast start and stop time and cycle rate of the EMM. The length of time for which a EMM is to be broadcast and the cycle rate are generally set to a certain value for Audience Mail Message EMMs, but they might be altered, for example, in dependence on the priority of the message (as specified by the operator) or the global bitrate of the broadcast signal.

Once the EMM has been generated, it is optionally ciphered using Ciphering Unit 36. The EMM may be ciphered, for example, if it is desired to keep the mail message confidential.

The EMM, together with the broadcast start and stop time and cycle rate, are then passed to the EMM injector 104. The EMM injector is responsible for inserting the EMM into the broadcast data stream at the appropriate times, in dependence on the broadcast start and stop time and cycle rate. The EMM is stored in a database at the Message Emitter (ME) 124 or 126. The EMM is inserted into the broadcast data stream by the appropriate software multiplexer (SMUX) 132 or 134, and multiplexer 4. The EMM is then transmitted in the broadcast signal for reception by the receiver/decoder 13.

Figure 7:
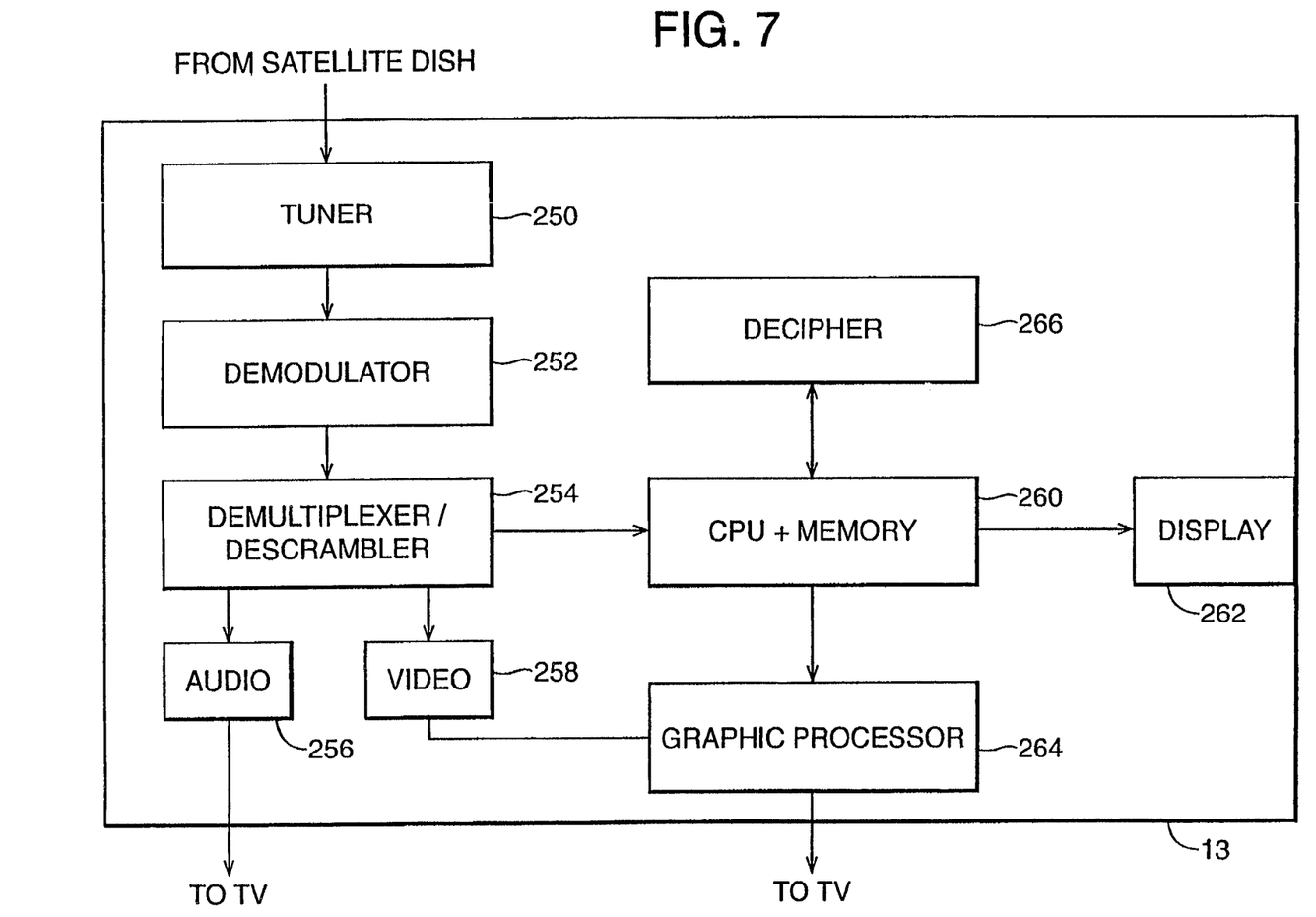
FIG. 7 shows the structure of part of a receiver/decoder.

Referring to FIG. 7, receiver/decoder 13 comprises tuner 250 and demodulator 252 for receiving and demodulating, respectively, the broadcast signal. The demodulated signal is passed to demultiplexer 254, which separates the various components of the signal. Audio signals are passed to audio processor 256, video signals are passed to video processor 258, and EMMs are passed to central processing unit (CPU) 260 and stored in a buffer. EMMs which are ciphered are deciphered by a deciphering unit 266 in the receiver/decoder.

A program, called a mail application, which is run on the CPU, allows the user to access Audience Mail Messages. The mail application extracts the various identifiers which specify the group of users for whom the message is intended. Stored in the CPU memory are various user identifiers, such as geographic zone and customer category of the user, and commercial offers, products and sessions which the user has purchased. The mail application compares the identifiers extracted from the EMM to the corresponding user identifiers. Where logical operators are included in the logical operator field 220 of the EMM, the application extracts the logical operators and applies them to the identifiers. In this way, the application is able to determine whether the user is one of the users for whom the Audience Mail Message is intended.

Taking the above example of a football match between Marseille and Paris, the application would check whether the geographic zone of the subscriber was Marseille or Paris, whether the customer category was (or included) football, and whether the user had not purchased product number 1234.

If the mail application decides that the user does not fulfil the criteria, then it removes the EMM from the buffer, and takes no further action. If the application decides that it does fulfil the criteria, then it extracts the mail message 226 from the EMM and stores it in a mail message buffer ("mailbox") in the CPU memory. The application then indicates to the user that there is mail waiting. This may be done either by producing an indication on the receiver/decoder display, or by displaying a message or icon on the television screen. In the latter case, graphic processor 264 is responsible for combining the message or icon with the video image.

Once the user has been informed that mail is waiting, he can access his mailbox and display the message on the screen. The mail application is responsible for extracting the text of the message from the Audience Mail Message EMM and displaying it on the user's television screen, via graphic processor 264, in response to a request from the user.

In some circumstances, for example, if the message has been assigned a high priority, the message is displayed directly on the television screen without the user taking any action. For example, in the case of a storm warning, the message may be assigned a high priority, and the receiver/decoder would then display the message directly on the television screen.

Finally, when the receiver/decoder has received a mail EMM, it "burns" the EMM, so that the message is not repeatedly displayed. This is done by comparing incoming mail EMMs to ones that have already been received, by using the index 224 in the EMM. Incoming EMMs which have the same index as EMMs which have already been received, are removed from the buffer.

To summarise, the commercial operator can send a message (ASCII string) to a group of subscribers. In order to do so, the DSTB contains a number of internal buffers in which it can store these messages. When the DSTB receives such a message, it instructs the subscriber (via a message on the TV set, for example) to consult his "mailbox". The viewer the uses specific menus to display these messages on the TV screen.

A specific command is used to allow the SMS to send such messages. The command contains the following information:

The unique smartcard identifier
The message itself, in the form of an ASCII string
Optionally, the priority of the message (Normal or Urgent). If the priority is omitted, the message has normal priority.
The group addressed depends on optional parameters:
No additional parameters—All the operator's smartcards are addressed.
Commercial offer—Only smartcards possessing the commercial offer store the message
Geographic zone—Only smartcards having the specified geographical zone number store the message.
Session number—Only smartcards possessing the session number store the message.

In one embodiment, only one of the methods used to select the group to be addressed can be used for any one message.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A method of broadcasting a message having a text portion to be communicated to a user, the method comprising broadcasting the message in the form of an entitlement management message for reception by the user, wherein the method is performed in a conditional access digital television system, wherein the message includes at least one identifier to define a group of users for whom the message is intended and at least one logical operator defining how a plurality of said identifiers are to be combined to target said group of users.

2. A method according to claim 1, comprising selecting said group from the totality of users and including in said message at least one identifier to define the selected group.

3. A method according to claim 1, wherein each identifier is an identifier of a group having a particular characteristic.

4. A method according to claim 3, wherein the characteristic is selected from at least one of geographic area, customer category, subscription to a particular commercial offer, purchase of a particular product, and purchase of a particular session.

5. A method according to claim 1, wherein the message includes a type identifier identifying that the message is intended for a group of users only.

6. A method according to claim 1, wherein the message includes a type specifier specifying that the message is of a type which includes a test portion.

7. A method according to claim 1, wherein the message includes a priority specifier for specifying the priority of the message.

8. A method according to claim 1, wherein the message includes a signature for verifying the contents of the message.

9. A method according to claim 1, wherein the message is encrypted.

10. A method according to claim 1, wherein the message is repetitively broadcast at a predetermined cycle rate.

11. A method of communicating a message having a text portion to a user, the method comprising receiving at a receiver/decoder the message in the form of an entitlement management message, and outputting from the receiver/decoder a signal representative of the text portion for communication to the user, wherein the method is performed in a conditional access digital television system, wherein the message includes at least one identifier to define a group of users for whom the message is intended and at least one logical operator defining how a plurality of said identifiers are to be combined to target said group of users, the receiver/decoder applying said at least one operator to said plurality of identifiers to determine whether the user is in the group of users.

12. A method according to claim 11, comprising determining whether the user is in the group of users and outputting said signal representative of the text portion if the user is in the group of users.

13. A method according to claim 12, wherein the determining step comprises comparing said at least one identifier with at least one identifier stored at the receiver/decoder.

14. A method according to claim 11, comprising generating a signal for advising the user of receipt of the message by the receiver/decoder.

15. A method according to claim 11, wherein the signal representative of the text portion is output in response to a request from the user.

16. A method according to claim 11, wherein the signal representative of the text portion is output automatically by the receiver/decoder.

17. A method according to claim 16, wherein the signal is output automatically from the receiver/decoder in dependence on the value of a priority specifier included in the message which specifies the priority of the message.

18. Apparatus used in a conditional access digital television system for generating a message having a text portion to be communicated to a user, said apparatus comprising means for generating the message in the form of an entitlement management message for reception by the user, wherein the message includes at least one identifier to define a group of users for whom the message is intended, and wherein said apparatus comprises means for including in said message at least one logical operator defining how a plurality of said identifiers are to be combined.

19. Apparatus according to claim 18, comprising means for selecting said group from the totality of users and means for including in said message at least one identifier to define the selected group.

20. Apparatus according to claim 18, wherein each identifier is an identifier of a group having a particular characteristic.

21. Apparatus according to claim 20, wherein the characteristic is selected from at least one o geographic area, customer category, subscription to a particular commercial offer, purchase of a particular product, and purchase of a particular session.

22. Apparatus according to claim 18, comprising means for including in said message a type identifier identifying that the message is intended for a group of users only.

23. Apparatus according to claim 18, comprising means for including in said message a type specifier specifying that the message is of a type which includes a text portion.

24. Apparatus according to claim 18, comprising means for including in said message a priority specifier for specifying the priority of the message.

25. Apparatus according to claim 18, comprising means for generating a signature for verifying the contents of the message.

26. Apparatus according to claim 18, comprising means for encrypting the message.

27. Apparatus used in a conditional access digital television system for generating and broadcasting a message having a text portion to be communicated to a user, comprising:
   means for generating the message in the form of an entitlement management message for reception by the user, wherein the message includes at least one identifier to define a group of users for whom the message is intended, and wherein said apparatus comprises means for including in said message at least one logical operator defining how a plurality of said identifiers are to be combined; and
   means for broadcasting said message including the at least one identifier and the at least one logical operator in the form of an entitlement management message to a user's receiver/decoder.

28. Apparatus according to claim 27, adapted to repetitively broadcast the message at a predetermined cycle rate.

29. A receiver/decoder used in a conditional access digital television system comprising means for receiving a message in the form of an entitlement management message having a text portion, and output means for outputting a signal representative of the text portion for communication to a user, wherein the message includes at least one identifier to define a group of users for whom the message is intended and at least one logical operator defining how a plurality of said identifiers are to be combined to target said group of users, the receiver/decoder comprising means for applying said at least one logical operator to said plurality of identifiers to determine whether the user is in the group of users.

30. A receiver/decoder according to claim 29, comprising means for determining whether the user is in the group of users, said output means outputting said signal representative of the text portion if the user is in the group of users.

31. A receiver/decoder according to claim 30, comprising means for comparing said at least one identifier with at least one identifier stored at the receiver/decoder to determine whether the user is in the group of users.

32. A receiver/decoder according to claim 29, comprising means for generating a signal for advising the user of receipt of the message by the receiver/decoder.

33. A receiver/decoder according to claim 29, comprising means for receiving a request from the user for output of the signal representative of the text portion.

34. A receiver/decoder according to claim 29, wherein the output means is adapted to output automatically the signal representative of the text portion.

35. A receiver/decoder according to claim 34, wherein the output means is adapted to output automatically said signal in dependence on the value of a priority specifier included in the message which specifies the priority of the message.

36. An entitlement management message used in a conditional access digital television system comprising a text portion for communication to a user, wherein the entitlement management message includes at least one identifier to define a group of users for whom the entitlement management message is intended, and wherein said entitlement management message comprises at least one logical operator defining how a plurality of said identifiers are to be combined.

37. A message according to claim 36, wherein each identifier is an identifier of a group having a particular characteristic.

38. A message according to claim 37, wherein the characteristic is selected from at least one of geographic area, customer category, subscription to a particular commercial offer, purchase of a particular product, and purchase of a particular session.

39. A message according to claim 36, including a type identifier identifying that the message is intended for a group of users only.

40. A message according to claim 36, including a type specifier specifying that the message is of a type which includes a text portion.

41. A message according to claim 36, including a priority specifier for specifying a priority of the message.

42. A message according to claim 36, including a signature for verifying the contents of the message.

43. A signal comprising an entitlement management message used in a conditional access digital television system, the entitlement management message comprising a text portion for communication to a user, wherein the entitlement management message includes at least one identifier to define a group of users for whom the entitlement management message is intended, and wherein said entitlement management message comprises at least one logical operator defining how a plurality of said identifiers are to be combined.

* * * * *